United States Patent

Clark

[15] 3,651,276

[45] Mar. 21, 1972

[54] AUTOMATIC PHASING OF SERVO SYSTEMS

[72] Inventor: Harold V. Clark, Palo Alto, Calif.

[73] Assignee: Ampex Corporation, Redwood City, Calif.

[22] Filed: Apr. 2, 1970

[21] Appl. No.: 25,052

[52] U.S. Cl. .......... 179/100.2 T, 178/6.6 A

[51] Int. Cl. .......... G11b 5/52

[58] Field of Search .......... 179/100.2 T; 178/6.6 A

[56] References Cited

UNITED STATES PATENTS

| | | | |
|---|---|---|---|
| 3,398,235 | 8/1968 | Baldwin et al. | 179/100.2 X |
| 3,379,828 | 4/1968 | Smith | 179/100.2 X |
| 3,293,359 | 12/1966 | Yasuoka et al. | 179/100.2 X |
| 3,213,192 | 10/1965 | Jensen | 179/100.2 UX |
| 3,358,080 | 12/1967 | MacLeod | 179/100.2 X |
| 3,414,684 | 12/1968 | Lichowsky | 179/100.2 |
| 3,423,523 | 1/1969 | Kosugi et al. | 179/100.2 X |
| 3,519,738 | 7/1970 | Morita et al. | 178/6.6 |

*Primary Examiner*—Malcolm A. Morrison
*Assistant Examiner*—Jerry Smith
*Attorney*—Robert G. Clay

[57] ABSTRACT

In a rotary scan magnetic tape transport, mistiming between the prerecorded control track signal and the prerecorded information signal tracks is compensated for by automatically advancing or retarding the phase angle of the rotary transducer assembly in discrete steps in response to a measured magnitude and direction of the timing error. During preliminary servo modes of the tape transport system in preparation for reproducing a prerecorded information signal, the tape is initially driven by a capstan servo so that synchronizing pulses carried by the tape control track assume a preselected phase relationship with a reference signal. The rotary transducer assembly is driven to phase synchronize with the same reference signal and is thereafter selectively advanced or retarded in phase in accordance with a detected timing error between the control track and the reproduced information signal. Thereupon, the capstan servo is coupled to synchronize the control track and thus the longitudinal tape position with the rotation of the transducer assembly while the assembly is rotatably driven to synchronize the reproduce information signal with the reference signal.

6 Claims, 3 Drawing Figures

INVENTOR.
HAROLD V. CLARK

BY

Larry C. Jackson
ATTORNEY

INVENTOR
HAROLD V. CLARK

BY

ATTORNEY

INVENTOR.
HAROLD V. CLARK

BY

ATTORNEY

AUTOMATIC PHASING OF SERVO SYSTEMS

In general, the present invention relates to servo control systems and, more particularly, to the phase relationship between several interconnected servo networks commonly employed in the control of wideband magnetic tape recorders, such as used for recording and reproducing video signals.

In one class of magnetic tape recorders, wideband signal capability such as required for video signals is achieved by rotating the magnetic record/reproduce transducer heads at high speeds in a path scanning across the magnetic tape as the tape itself is longitudinally advanced passed the rotating transducer assembly. The greater magnitude of the head-to-tape speed achieved by this arrangement has made magnetic tape recording and reproducing of broadcast quality video signals practical. However, due to the timing complexities of the various synchronizing waveforms carried by the video signal and due to the speed and phasing control requirements of the transport itself, such systems require a variety of servo mechanisms and servo circuits for insuring high stability of the reproduce signal.

In one servo controlled operation, which has been found highly advantageous for stabilizing the transport during playback, a longitudinal control track signal prerecorded simultaneously with the video signal is used during the reproduce mode to phase position the translation of the tape with respect to the rotating transducers. A standard broadcast quality machine employs four magnetic transducers in quadrature relation about the circumference of the rotary assembly. Each revolution of this magnetic head wheel causes four substantially transverse video tracks to be recorded. For recording an entire video frame, 16 revolutions of the head wheel are required, 8 revolutions for each of the two fields comprising the frame. The control track signal is generally comprised of an alternating signal having a frequency equal to that of the rotational velocity of the head wheel such that one full revolution of the head wheel corresponds to a complete period of the control track signal. Additionally, the control track is usually provided with a set of framing pulses, consisting of a magnetically recorded electrical pulse coincident with the frame synchronizing waveform of the recorded video signal. In order to provide for proper timing between the head wheel and the control track, a single record/reproduce control track transducer is mounted a predetermined distance and in fixed relation with respect to the head wheel assembly. During playback, longitudinal translation of the tape and rotation of the head wheel are coarse phased locked through the intermediary of the control track signal. The phase lock disposes the angle of rotation of the head wheel assembly so that the proper one of the four transducers scans the proper video track. Constant spacing is sought between the control track transducer and the head wheel in the interim between recording and reproduction so that the proper head to track relation is maintained. However, this spacing is unavoidably subject to some variation, where only slight misalignment can result in improper phase control between head and video tracks.

In addition to this basic phasing operation, it is in many instances desirable to synchronize the frames of the reproduced video signal with the frames of another video signal, such as developed live by a video camera. Usually, the two video signal sources are synchronized to a common reference, such as a studio synchronizing signal. In preparation for synchronized playback of the video tape, the tape is initially longitudinally driven so that the control track frame pulses are coincident with the studio frame pulses. This is known as coarse framing. During this framing interval, the transducer assembly is rotated to a preselected phase relationship with the studio reference signal and, if the control track transducer is properly aligned, the transducers carried by the rotating assembly will scan the proper transverse tape track. Thereupon, rotation of the head wheel is switched so as to synchronize the reproduced vertical sync with the studio vertical sync and the capstan drive is controlled so as to phase lock the control track reproduced signal with the rotation of the transducer assembly. However, in the event that there has been some misalignment of the control track transducer between record and playback modes, or different machines are used for recording and thereafter playing back the same video tape, the resulting mistiming or phase error between reproduce control track signal and the reproduce video signal will disrupt the normal servo operations leading up to framing. A certain amount of this mistiming can be tolerated. However, if this error is too large, framing of the reproduce signal to the studio synchronizing signal is lost when the capstan servo is released from the studio sync and coupled to servo to the rotation of the transducer assembly.

Accordingly, it is an object of the present invention to provide a servo system for tape transports of the type characterized for automatically changing the phase relationship between the rotation of the transducer assembly and the studio reference signal as required in order to compensate for timing errors resulting from mistiming between the control track signal and the reproduced information signal.

It is another object of the present invention to provide such a servo system which will operate automatically to insure that the rotating transducer assembly is phase positioned to scan the particular prerecorded transverse video track which will allow the reproduce signal to be synchronized to the studio reference signal during an automatic framing sequence.

These and other objects are achieved in accordance with the present invention by selectively step adjusting the phase relationship between the rotation of the head wheel assembly and the studio reference signal in accordance with an automatically detected error in the timing of the control track signal. In particular, the magnitude of this timing error, caused for example by misalignment of the control track transducer, is measured by counting the number of relatively high rate clock pulses, such as the video horizontal line synchronizing pulses, occurring between a reproduce vertical sync pulse and the following positive going zero crossing of the control track signal. If a count is registered which indicates misalignment between the spacing of the control track transducer and the rotary head assembly, then the rotary assembly is advanced or retarded in preselected phase steps in accordance with the magnitude and direction of the timing error. The phase stepping of the rotary head assembly is achieved by selecting different ones of a plurality of phase related tachometer signals for feedback in the servo circuit controlling the rotary assembly, each signal phase representing a different circumferential position on the assembly.

As an important feature of the present invention, the measurement of the magnitude of the timing error and the step rephasing of the transducer assembly are both performed in multiples of a preselected fractional interval of the full period of the control track signal. For a standard machine, the period of the control track signal corresponds to a full rotation of the transducer assembly. This preselected interval is related to the timing relationship between adjacent transverse video tracks such that the present invention operates in effect to select a proper one of a plurality of adjacent transverse tracks. Without this operation, timing errors caused by misalignment of the control track transducer would prevent proper track selection and thus preclude subsequent synchronization of the reproduce signal with the studio signal.

These and other objects, features and advantages of the invention will become apparent from the following description and accompanying drawings illustrating the preferred embodiment of the invention, wherein.

Figure 1:
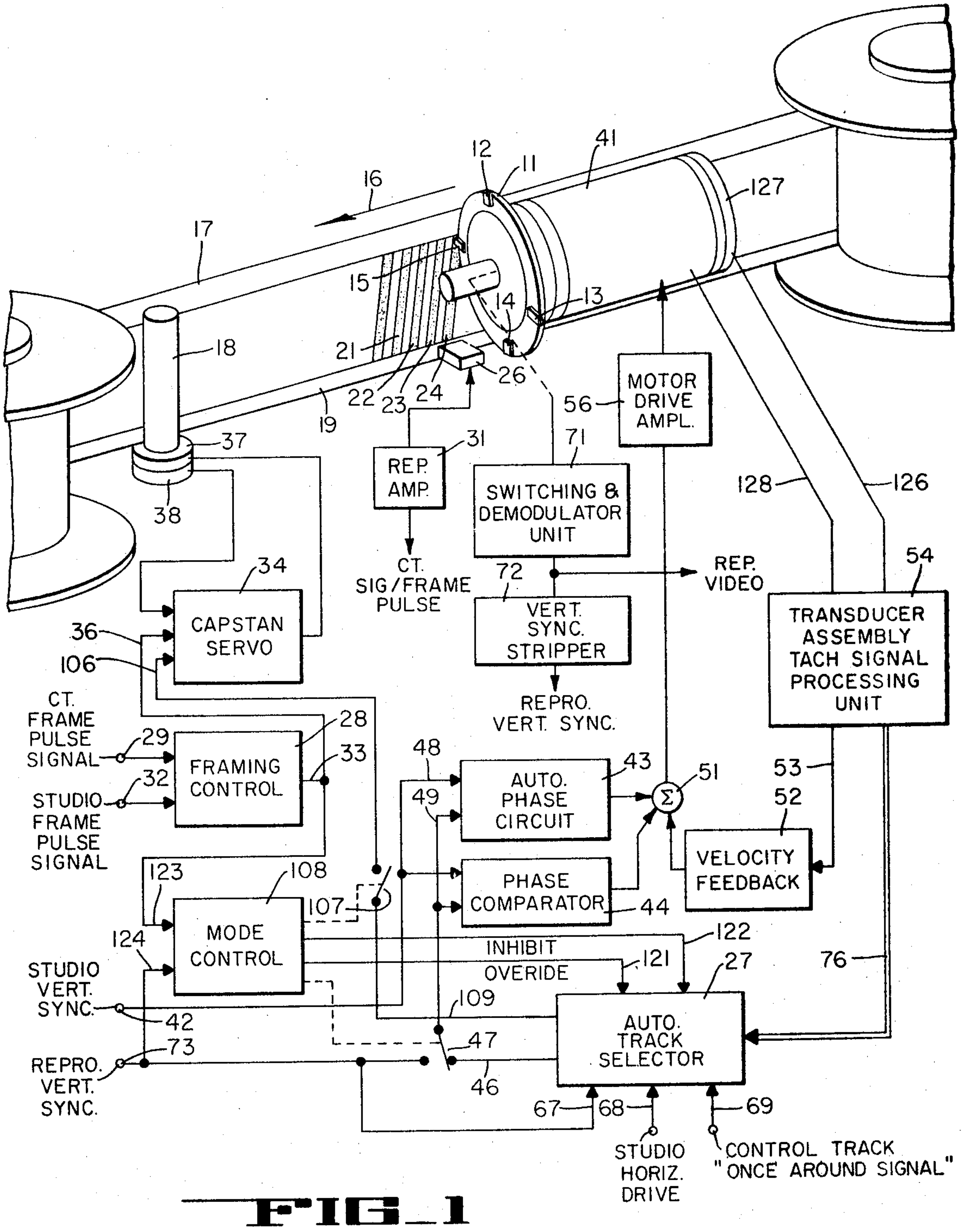
FIG. 1 is a diagrammatic view of a portion of the tape transport to be controlled and block diagram of the servo networks controlling the tape transport in accordance with the present invention.

With reference to FIG. 1, the present invention is shown to operate in the environment of a wideband magnetic tape transport of the type including a rotary transducer assembly 11, here carrying a plurality of four transducers 12, 13, 14 and 15 in quadrature relation, for rotation in a plane substantially transverse to a direction 16 of longitudinal advancement of magnetic tape 17 by a capstan 18. The rate at which tape 17 is driven in direction 16 is coordinated with the rotational speed of assembly 11, such that transducers 12–15, during recording, lay down a plurality of successive and substantially transverse wideband information signal tracks, such as tracks 21, 22, 23 and 24, for each revolution of the assembly. In order to insure a proper scanning of the transverse tracks, such as tracks 21–24, by the transducers of assembly 11 during a reproduce mode, a longitudinally oriented control track 19 is provided which carries a signal simultaneously recorded with the recording of the wideband information signal tracks 21–24 so that, during playback, the control track signal can be used as a means of synchronizing tape advancement with the phase of rotation of assembly 11. Control track 19 is recorded and subsequently reproduced by a single record/reproduce transducer 26 which is designed to maintain a fixed spatial relation with respect to assembly 11. However, if mechanical alignment of transducer 26 is somehow disturbed in the interim between the record and reproduce operations, or if different machines are used for recording and thereafter reproduction, the timing characteristics of the playback control track signal will deviate from the desired and expected phase relationship with the scanning of transverse tracks 21–24.

In accordance with the present invention, an automatic track selector 27 is provided for first detecting or sensing any mistiming of the control track signal from track 19 with respect to the timing of the reproduce signals generated from the wideband signal tracks, such as tracks 21–24, and automatically effecting a change or an adjustment in the rotational phase of transducer assembly 11 so as to compensate for the detected timing error during start-up sequencing of the transport servo systems. The automatic track selector 27, functioning in accordance with the present invention, will be described in conjunction with the sequence of operations performed by the various servo circuits controlling the transport in preparation for playing back a wideband information signal, which in this instance is a video signal.

In operation, the reproduce video signal from the transport is to be synchronized frame by frame with a studio signal, such that other video sources synchronized to the same studio signal will in turn be synchronized with the tape transport reproduce signal, thus allowing for alternate transmission of any one of the various video source signals without phase discontinuities. Accordingly, the initial function of the transport system is to frame the reproduce signal with the studio reference signal, wherein this operation is facilitated through the use of the prerecorded framing pulses carried by control track 19. A framing control 28 is responsive at one of its inputs 29 to the control track frame pulse signal developed by transducer 26 and reproduce amplifier 31, and is responsive at another of its inputs 32 to a studio frame pulse signal. These signals have a rate depending upon the particular video standard used. In this instance, the frame rate is 30 pulses per second or one-half the rate of the vertical synchronizing waveforms at 60 pulses per second. Control 28 is thus responsive to any phase difference between the frame pulse signals at inputs 29 and 32 to issue a control signal at its output 33 for changing the longitudinal position of tape 17 by advancing or retarding the rotation of capstan 18. A capstan servo 34 having an input 36 responsive to the framing control signal operates in cooperation with a capstan motor drive 37 and capstan tachometer 38 as shown to provide the speed control. One particularly advantageous arrangement for effecting this framing operation is described in a copending application entitled "Rapid Frame Synchronization of Video Tape Reproduce Signals" by Harold V. Clark and Gary B. Garagnon, Ser. No. 11,473, filed Feb. 16, 1970, which has been assigned to the assignee of the present application.

Concurrently with the framing operation performed by control 28, transducer assembly 11 is driven by motor 41 such that the rotational phase thereof is synchronized with a studio reference signal, in this instance being the studio vertical sync pulse signal received at a terminal 42. In particular, the studio vertical sync is fed from terminal 42 to phase comparison networks, here consisting of a steady state phase error correction circuit 43 and a dynamic phase comparator 44 which detect phase differences between the studio vertical sync and a feedback signal developed by automatic track selector 27 at an output 46 and applied to circuit 43 and comparator 44 via a switch 47. Thus, circuit 43 and phase comparator 44 develop error signals in response to any phase difference between the pulse trains appearing on lines 48 and 49, where such error signals are summed at a junction 51. In addition, summing junction 51 also receives an error signal component for controlling the velocity of the rotation of assembly 11. This latter error signal is developed by velocity feedback circuit 52 responsive to a tachometer signal issued on line 53 from a tachometer signal processing unit 54, which in turn receives signals representing the rotation of assembly 11. A motor drive amplifier 56 is responsive to the resultant of the summed error signals at junction 51 for energizing motor 41 to provide the desired control over the rotation of transducer assembly 11. During this initial stage in the operating sequence, automatic track selector 27 is conditioned to provide a standard phase tachometer feedback signal, namely the signal phase employed during recording operations, such that the rotation of assembly 11 is phase synchronized to dispose a particular one of transducers 12 through 15 to scan across tape 17 upon the occurrence of each studio vertical synchronizing pulse.

Figure 3:
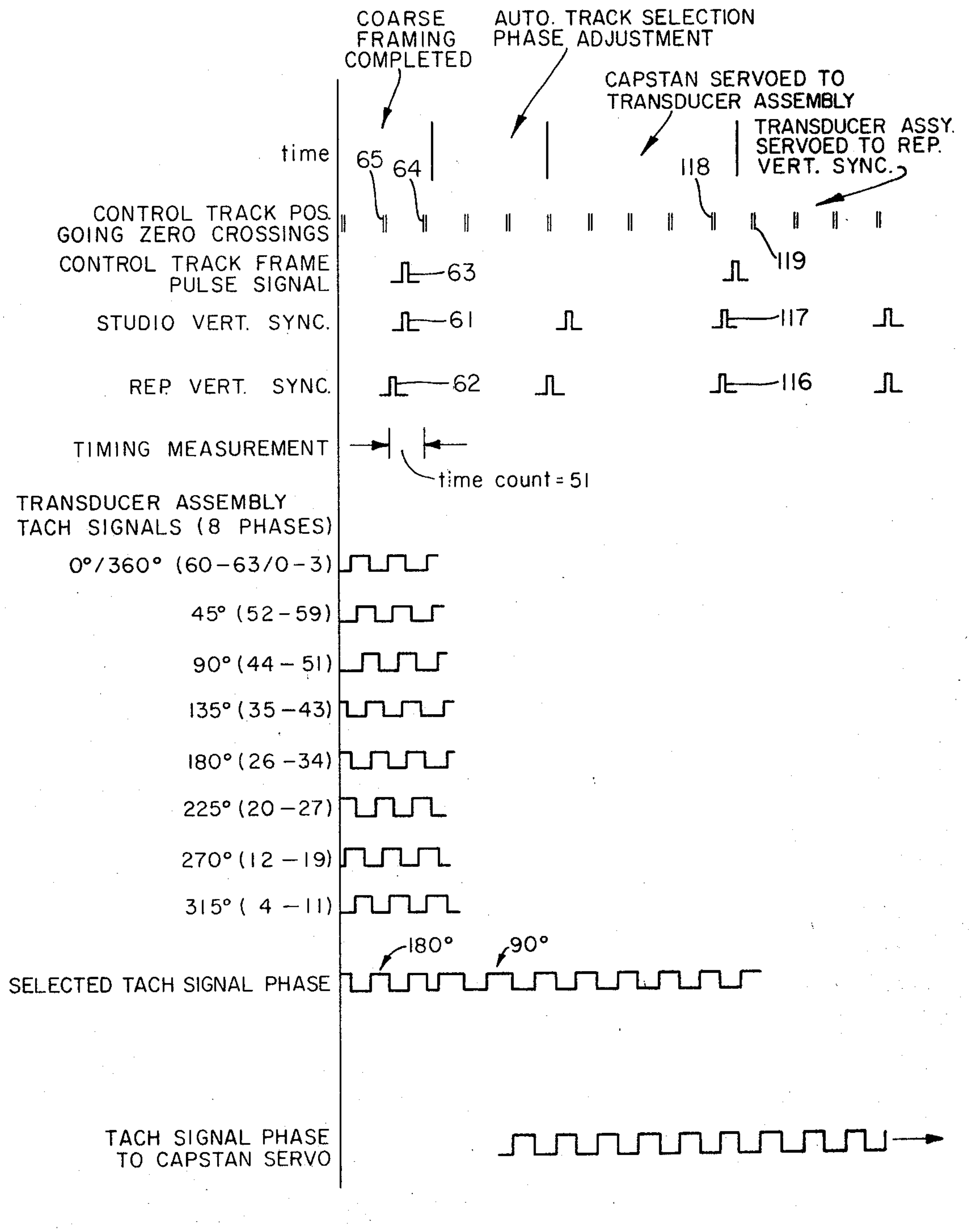
FIG. 3 is a graph illustrating the timing relationship between various waveforms of the system shown by FIG. 1, during its operation in accordance with the present invention.

After the initial framing operation effected by control 28 and the servoing of transducer assembly 11 to studio vertical sync as described, if there are no mistiming errors in the control track signal, then tape 17 will have been positioned such that one of transducers 12 through 15 scans across the transverse video track carrying the recorded vertical synchronizing waveform at the same time the studio vertical synchronizing pulse occurs. If, on the other hand, the control track reproduce signal is for one reason or another mistimed with respect to the orientation of the transverse tracks and transducer assembly 11, then the reproduced vertical synchronizing signal from the tape will be offset from the studio vertical synchronizing pulse. This condition resulting from a mistimed control track signal is illustrated by the waveform relationships as shown in FIG. 3, between a studio vertical synchronizing pulse 61 and a reproduce vertical synchronizing pulse 62 from the tape. At this point in time, framing has been achieved in that the studio vertical sync pulse 61 is coincident with a control track frame pulse 63 as shown. The higher rate control track signal utilized for phase locking the rotation of assembly 11 as shown as a series of pulses, each pulse representing a positive going zero crossing of the alternating control track signal. The time interval between adjacent zero crossings of the higher rate control track signal corresponds to a full rotation of the transducer assembly and thus for transverse video tracks, such as tracks 21–24. It will be apparent that when the timing error between the control track signal (as represented by the zero crossing pulses in FIG. 3 and the reproduce vertical sync waveforms such as represented by pulse 62 in FIG. 3) becomes too great, then the coarse framing operation as described above results in an incorrect transducer scanning the transverse track carrying the reproduce vertical sync waveform. Thereafter, when transducer assembly 11 is coupled via operation of a switch 47 to servo to a phase comparison between studio vertical sync and the reproduce vertical sync off tape, the erroneous phase relation between the rotation of assembly 11 and the transverse track carrying the reproduce vertical sync caused by mistiming of the control track signal results in loss of frame synchronization. In other words, the framing operation must dispose the rotational phase of head wheel 11 such that a particular one of transducers 12 through 15 is within 45° of the track carrying the reproduce vertical synchronizing pulse before the transducer assembly 11 can be servoed to the reproduce vertical sync pulses. This, in turn, limits the tolerable timing error between the control track signal and the video signal carried by the transverse tracks to no more than 45° of the period of the control track signal. Deviations or timing errors greater than this limit cause the transducers of assembly 11 to select the incorrect transverse video track during the coarse framing operation. Such incorrect track selection results in loss of framing when the phase control of assembly 11 is switched to be controlled by a phase comparison between studio vertical sync and reproduce vertical sync and the capstan servo is switched to servo the longitudinal motion of tape 17 to the rotation of assembly 11.

Standard timing, that is with no timing error between the control track and the recorded video signal, requires that each reproduce vertical sync pulse will lie substantially midway between adjacent positive going zero crossings of the control track signal. If the reproduce vertical sync deviates from this relationship by an amount corresponding to more than 45° of the control track signal period, then erroneous track selection occurs with the above mentioned loss of framing as a result.

Figure 2:
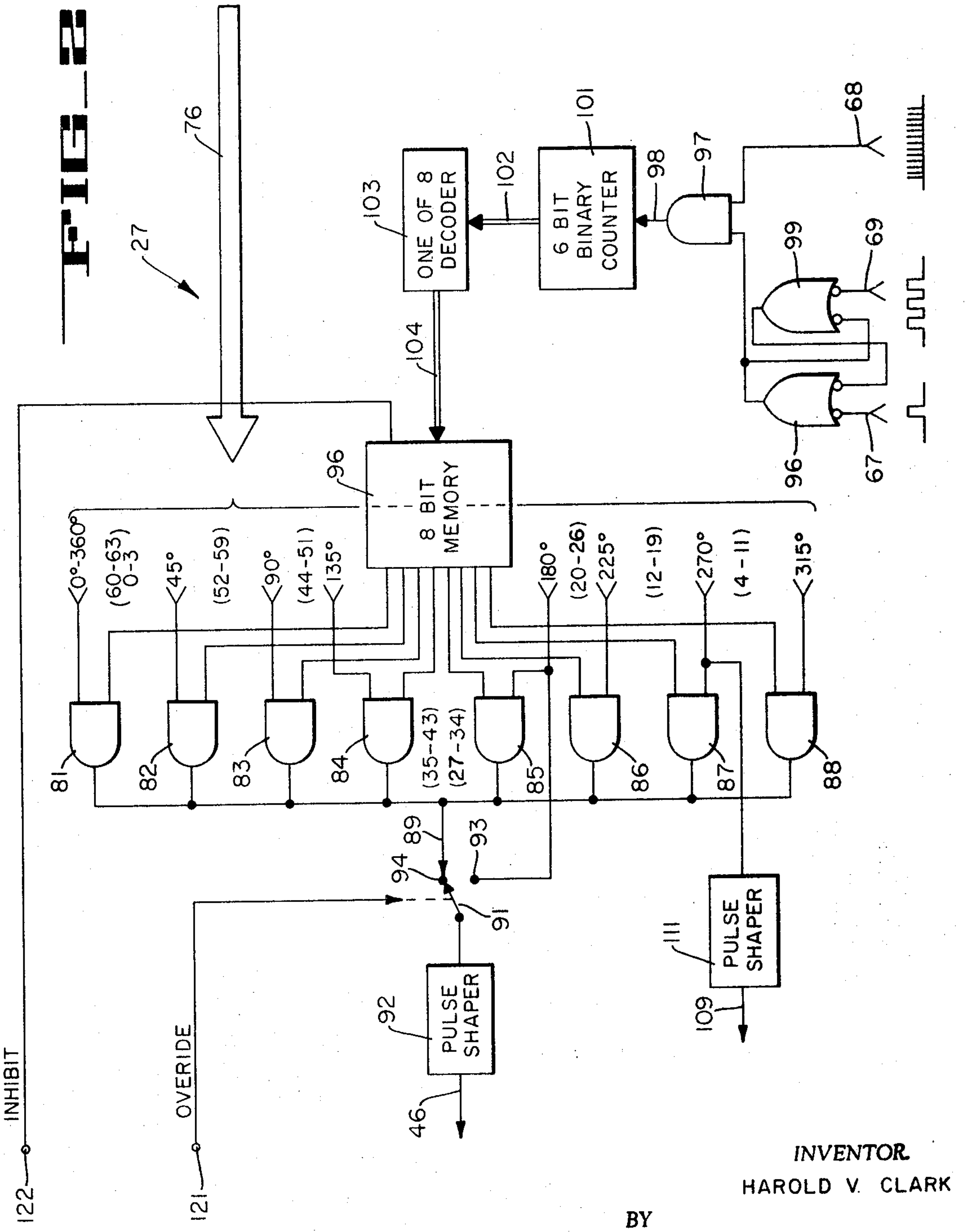
FIG. 2 is a detailed schematic diagram of the automatic track selection network of FIG. 1.

With reference to FIGS. 2 and 3, after completion of coarse framing, the present invention provides as a first step for measuring the time relationship between the reproduce vertical sync pulse 62 and the next occurring positive going zero crossing of the control track, in this instance represented by pulse 64. Based on this measurement, if mistiming of the control track is indicated, an automatic phase adjustment is performed on the rotation of assembly 11 so as to retain the condition of frame synchronization when the various servo circuits are switched to a final and playback mode of operation. As shown by FIG. 3, the reproduce vertical sync pulse 62 has its leading edge somewhat advanced from its expected location in line with synchronizing pulses 61 and 63, indicating that the control track is mistimed with respect to the transverse video tracks, one of which carries reproduce vertical sync pulse 62. As best shown by FIG. 2, the degree of this mistiming is determined by counting the number of studio horizontal sync pulses occurring between reproduce sync pulse 62 and the next zero crossing of the control track signal as represented by pulse 64. The reproduce vertical sync, studio horizontal sync and the control track zero crossing pulses are received at input lines 67, 68 and 69 respectively. The control track signal is developed as noted above by the output of amplifier 31 in response to control track transducer 26. The reproduce or off tape vertical sync pulse is derived from the output of transducers 12–15 as developed by a switching and demodulator unit 71 and a vertical sync stripper 72, where the output of stripper 72 is extended to a terminal 73.

Prior to this time measurement, transducer assembly 11 has been synchronized to a standard phase relationship with respect to the studio vertical sync signal received at terminal 42. Standard phasing of the transducer assembly is provided by initially selecting what will be called a standard phase feedback signal from one of a plurality of phase related signals developed by tachometer signal processing unit 54, for connection to line 46 and thus through switch 47 to line 49. With reference to FIG. 3, the standard feedback signal in the present embodiment corresponds to that particular tachometer signal phase which was employed during recording to synchronize one of the head wheel transducers with the vertical sync pulse of the video signal being recorded.

Let it be assumed that the standard tach signal phase for the present embodiment is 180°. Also, it is assumed that when the capstan drive is servoed to the transducer assembly rotation, the tach signal having a phase of 270° will be synchronized to the control track signal so long as there is no mistiming. It will be noted that if the control track signal is properly timed, then the reproduce vertical sync pulse 62 will line up with the studio vertical sync pulse 61 and the control track frame pulse 63 upon completion of coarse framing. Furthermore, with the 180° phase signal employed in the feedback loop controlling the rotational position of assembly 11 and again without any control track timing error, the 270° phase tachometer signal will be substantially synchronous with the control track signal so that the capstan servo can be switched at that point to servo to the 270° tachometer phase signal and maintain proper track selection with respect to the transducers of assembly 11.

In contrast as shown by FIG. 3, the control track signal does exhibit significant mistiming such that, when coarse framing has been completed, if the capstan were to be servoed to the 270° phase tachometer feedback signal then framing would be lost by virtue of the erroneous track selection caused by the mistimed control track signal. Accordingly, phase correction by selector 27 is required.

With reference to FIG. 2, selector 27 receives the plurality of eight—differently phased tachometer signals from tach signal processing unit 54 over a line 76. Each such signal is fed to a different one of a plurality of electrical gates 81, 82, 83, 84, 85, 86, 87 and 88 for selective connection of any one of these signals to an output 89 which is jointly connected to all of the outputs of the respective gates. Output 89 is in turn fed through an override switch 91 and a pulse shaper 92 to output line 46, also shown by FIG. 1. Override switch 91 serves to communicate output 46 with either the standard phase tachometer feedback signal of 180° through a terminal 93 or the selected phase signal from the output of gates 81 through 88 at terminal 94. Pulse shaper 92 is responsive to the positive going lead edge of each of the waveforms and issues a short duration trigger pulse. The other inputs of each of gates 81–88 are operated by an eight bit electrical memory 96 which in turn is responsive to a measurement of the time difference between the occurrence of a reproduce vertical sync pulse, such as pulse 62 in FIG. 3, and the next positive going zero crossing of the control track signal, such as represented by pulse 64. In accordance with this arrangement, after coarse framing has been acquired and control track mistiming is detected, then a particular one of gates 81 through 88 is actuated so as to shift the phase of the tachometer signal in the feedback path including selector 27, such that head wheel assembly 11 is advanced or retarded in discrete angular steps to accommodate the control track error.

The time measurement operation is performed as an incoming reproduce vertical sync pulse, such as pulse 62 in FIG. 3 is received at input line 67 of selector 27 as shown by FIG. 2. The reproduce sync pulse causes a gate 96 to responsively condition another gate 97 to pass the relatively high rate studio horizontal sync pulses at input lines 68 to an output 98 of gate 97. Additionally, gate 96 has its output and one of its inputs interconnected with still another gate 99, such that the output of gate 96 locks gate 97 in a transmissive condition until gate 99 receives the next positive going zero crossing pulse at an input line 69. Thus, the various gates function to pass to an output 98 the number of studio line pulses occurring between a reproduce vertical sync and the next zero crossing of the control track signal. The actual number of these pulses are registered by six bit binary counter 101 and the subject count is available at connection 102 following the zero crossing pulse against which the reproduced vertical sync pulse is measured.

The time period of one control track cycle defines the range of all possible timing relationships between the reproduce vertical sync and the control track positive going zero crossing, and this interval in the present embodiment is 4 milliseconds duration. Since horizontal line sync pulses occur every 63½ microseconds in a standard 525—line system, for which the present embodiment of the invention is adapted, approximately 64 such pulses will occur during one full period of the control track signal. The same is true for 625 line standards. This is a convenient binary number from which the modulus of counter 101 is selected. Output 102 of counter 101 thereby presents in binary form the instantaneous counting state of counter 101. As the operation of gates 81 through 88 provide for shifting the rotational phase of the transducer assembly by 45°, by virtue of the 45° phase difference between the eight tachometer signals available on line 76, it is desirable to measure the control track phase error in discrete steps or time slots corresponding to the 45° step adjustments. Accordingly, the 64 combinations developed by the binary states of counter 101 are transformed into eight signal states by a decoder 103. Output connection 104 from decoder 103 thus consists of eight separate signal lines, each signal line being energized when a particular counting range is detected by the combination of gates 96, 97 and 99, counter 101, and decoder 103. The count ranges or time slots are indicated in FIGS. 2 and 3 adjacent an associated tachometer signal phase.

After each measurement performed in this manner, the signal conditions carried by output connection 104 are stored in memory 96 which, in turn, energizes a particular one of gates 81 through 88 in accordance with the magnitude of the measurement.

If the reproduce vertical sync pulses are properly timed with respect to the control track signals during coarse framing, then approximately 2 milliseconds will occur between the leading edge of the reproduce sync and the next control track zero crossing. This corresponds to one-half the control track period, and is represented by a count of 32 on counter 101. Decoder 103 and memory 96 cooperate in response to a measured count of 32 to condition gate 85 to pass the 180° phase tachometer signal to output line 46. In this instance, where no control track error exists, standard phase synchronization of assembly 11 is thus maintained.

If on the other hand as illustrated by FIG. 3, the reproduce vertical sync pulse 62 occurs prior to (or later than) control track zero crossing pulse 64 by a horizontal line sync counter greater (or less) than 32, adjustment of the phase of rotation of assembly 11 is required. Here, the timing error is indicated to be of a magnitude of 51. Cooperation between counter 101 and decoder 103 causes memory 96 to condition gate 83 (corresponding to a count of 44 to 51) to pass the associated 90° phase signal to output line 46. Thus, the selected tach signal phase appearing on line 46 changes from the standard phase of 180° to 90° as shown by FIG. 3. Responsively, the rotational phase of transducer assembly 11 is phase adjusted, in this instance retarded, until the 90° tachometer signal fed to phase comparator 44 over line 49 is properly synchronized to the studio vertical sync pulses fed by way of line 48 to comparator 44. FIG. 3 illustrates the transient condition of the selected tachometer signal phase during this phase adjustment interval.

Concurrently with this phase adjustment interval, or as shown in FIG. 3 subsequent thereto, capstan servo 34 of FIG. 1 has an input 106 thereof connected through a switch 107 by mode control 108 to receive the 270° transducer assembly tachometer signal at an output 109 of selector 27. With reference to FIG. 2, output 109 is shown to be derived from the 270° phase tachometer signal through a pulse shaper 111 responsive to the positive going leading edge of that tachometer signal.

The foregoing sequence of operations causes transducer assembly 11 to incur a step phase adjustment, in this instance a retardation of 90° with respect to studio vertical sync. As the longitudinal position of the tape and, in particular the control track signal carried thereby, is servoed to the rotation of the transducer assembly, transducers 12 through 15 are properly phased so as to scan the correct transverse video tracks. The steady state condition achieved at this point in the operating scheme is illustrated by FIG. 3 wherein a reproduce vertical sync pulse 116 has been moved to within 45° of a control track period from a studio vertical sync pulse 117. Concurrently, the control track as represented by zero crossing pulses 118 and 119 has been offset from the studio vertical sync pulse 117.

While the waveforms of FIG. 3 indicate that the phase adjustment of the transducer assembly and the servoing of the capstan to the rotation of transducer assembly 11 are successive operations, in actual practice, these two functions can be effected concurrently. In this manner the operations cooperate toward a final end result, that being the correct transducer to transverse track selection so as to avoid loss of framing.

As a final step in the framing sequence, after the capstan has been servoed to the rotation of transducer assembly 11, mode control 108 functions to release switch 47 from its connection to output line 46 and to connect line 49 to the reproduce vertical sync pulses received at terminal 73. This causes phase comparator 44 to synchronize the rotation of transducer assembly 11 such that studio vertical sync pulses and reproduce vertical sync pulses are coincident. The particular selected tachometer phase appearing on output line 46 from selector 27 is no longer significant, although the capstan and thus tape drive continues to be controlled in accordance with the 270° phase tachometer signal provided by output line 109 from selector 27.

To accommodate proper phasing of transducer assembly 11 during record modes, an override signal may be generated by mode control 108 and applied at input line 121 of selector 27 for operating switch 91 to connect line 46 and pulse shaper 92 to the standard 180° phase tachometer signal available at terminal 93. In addition, an inhibit signal is provided over a line 122 from mode control 108 for inhibiting the operation of memory 96 to store the output of decoder 103 until certain servo conditions have been detected. In the present embodiment, memory 96 is inhibited by mode control 108 until playback vertical sync is present, and the capstan servo has stabilized to a steady state condition. Thus, mode control 108 is responsive to the output of framing control 33 as received at an input 123 and is responsive to the reproduce vertical sync signal received at input 124.

The automatic track selection operation of the present invention cooperates with a system described in a United States application entitled "Automatic Tracking Method and Apparatus for Rotary Scan Tape Transport," by Allen J. Trost, Ser. No. 25,910, filed Apr. 6, 1970, and assigned to the assignee of the present application. In that invention, minor discrepancies between the phase of the control track signal carried by track 19 and the rotational phase of transducer assembly 11 are compensated for by a closed loop servo system which automatically phases tape 17 such that the transducers of assembly 11 scan the center of the transverse tracks. The system described in that application corrects phasing errors between assembly 11 and the transverse video tracks of tape 17, so long as such errors do not exceed 45° of the control track period. It will be appreciated therefore that the present invention, by virtue of its automatic track selection whereby transducer assembly is corrected to within 45° of the desired phase relationship with the transverse tracks, acts to bring the phase relationship to within the capture range of the automatic tracking servo system described in the above identified U.S. application by Allen J. Trost.

Further details regarding the construction and operation of particular and preferred tachometer signal processing unit 54 may be found in a U.S. application Ser. No. 25,054 for "Brushless DC Motor Including Tachometer Commutation Circuit," by Harold V. Clark, filed on Apr. 2, 1970, and assigned to the assignee of the present application. Briefly, unit 54 receives a tachometer signal over a line 126 from tachometer 127 which consists of eight pulses or electrical transitions for each full revolution of assembly 11. In addition, unit 54 receives two quadrature related sinusoidal signals over a line 128, wherein such signals are generated by a pair of Hall effect generators disposed within motor 41 at an angular spacing of 90° with respect to the axis of rotation of permanent magnet rotor (not shown). The eight point tachometer signal received over line 126 is used in the velocity feedback loop defined by line 53 and velocity feedback 52 for maintaining the rotation of assembly 11 at the proper speed. In addition, the eight pulses per revolution tachometer signal is employed in combination with the quadrature related sinusoidal signals available on line 128 to develop the eight differently phased discreet level tachometer signals available over connection 76. However, for the construction and operation of the invention in general, any of a variety of means apparent to those skilled in the art may be used to develop the phase related signals indicating angular position of assembly 11.

Steady state phase error correction circuit 43 has been made the subject matter of a separate application, Ser. No. 25,053 for "Steady State Phase Error Correction Circuit," by Harold V. Clark and Gerald C. Engbretson filed Apr. 2, 1970 and assigned to the assignee of the present application. Briefly, this circuit functions to reduce steady state or essentially DC phase errors in the control over the rotation of assembly.

What is claimed is:

1. In a tape transport system having a rotary transducer assembly for reproducing an information signal prerecorded on a medium driven passed such assembly wherein a prerecorded control signal carried by the medium is employed to maintain proper phase synchronization between the rotation of the assembly and the movement of the medium, and wherein the reproduced information signal is to be synchronized with a reference signal, the combination comprising:

- capstan servo means for driving the medium such that the reproduced control signal carried thereby is time synchronized with a reference signal,
- transducer assembly servo means for positioning the angular rotation of the assembly to a preselected phase relationship with said reference signal,
- phase detection means sensing the timing relationship between the reproduced information signal and the reproduced control signal carried by the medium while said transducer assembly is in said preselected phase relationship with said reference signal, and
- phase selector means connected to said transducer servo means and responsive to said phase detection means selectively repositioning the phase relationship between the rotation of said transducer assembly and said reference signal in accordance with said detected timing relationship.

2. In a transport system as defined in claim 1, the combination further comprising:

- mode control means synchronizing said capstan servo to the rotation of said assembly in response to said phase selector means repositioning the phase of rotation of said assembly with respect to the reference signal.

3. In a transport system as defined in claim 2, the combination further defined by said mode control means controlling rotation of said assembly to synchronize said reproduced information signal with said reference signal subsequent to said capstan being synchronized to the rotation of said assembly.

4. In a transport system as defined by claim 1, wherein said transducer assembly carries four transducers in quadrature and scans the record medium substantially transverse to the direction of longitudinal movement thereof and the recorded information signal is carried by a plurality of transverse tracks, the combination further defined by said phase detection means sensing the timing between the reproduced information signal and the control signal in multiples of a preselected discrete timing interval, said timing interval being no greater than the time lapse for 45° of revolution of said assembly during normal scanning speed.

5. A method for selective phasing the timing relationship between a rotating transducer assembly of a tape transport and a prerecorded control track signal carried by a magnetic tape, comprising:

- rotating the transducer assembly in a preselected phase synchronization with a reference signal,
- longitudinally driving the tape such that the control track signal assumes a preselected phase synchronization with said reference signal,
- measuring the phase relationship between a reproduce information signal developed by the transducer assembly and a reproduced control track signal,
- selectively adjusting the phase relationship between the angular phase of the transducer assembly and the reference signal in accordance with said measured phase relationship, and
- releasing the tape drive from its initial synchronized condition with respect to said reference signal and driving said tape such that it is phase synchronized with the rotation of said transducer assembly.

6. The method as defined in claim 5, wherein said transducer assembly carries four transducer heads such that for every full rotation of the assembly four transverse tracks are scanned, and said step of adjusting the phase relationship between the transducer assembly and the reference signal being further defined by a plurality of tachometer feedback signals being selected to provide step adjustments of a multiple of an angle no greater than 90° of a full rotation of said assembly so that the phase relationship between the transducer assembly and the control track positions the transducer assembly within ± such angle of the proper transverse track.

* * * * *